United States Patent [19]

Matsubara et al.

[11] Patent Number: 5,024,534
[45] Date of Patent: Jun. 18, 1991

[54] TEMPERATURE SENSOR FOR USE IN A SPARK PLUG OF AN INTERNAL COMBUSTION ENGINE

[75] Inventors: Yoshihiro Matsubara; Shuzo Matsumura, both of Nagoya, Japan

[73] Assignee: NGK Spark Plug Co., Ltd., Nagoya, Japan

[21] Appl. No.: 378,711

[22] Filed: Jul. 12, 1989

[30] Foreign Application Priority Data

Sep. 27, 1988 [JP] Japan .................................. 63-241581
Sep. 29, 1988 [JP] Japan .................................. 63-245761

[51] Int. Cl.⁵ .......................... G01K 1/14; G01K 7/02; F02P 17/00
[52] U.S. Cl. ..................................... 374/144; 313/10; 340/870.17; 340/870.28
[58] Field of Search .......................... 374/144; 313/10; 340/870.17, 870.28, 870.29

[56] References Cited

U.S. PATENT DOCUMENTS 1,084,838  1/1914  Beck ..................................... 374/144
3,940,987  3/1976  Green et al. ......................... 374/144
4,361,036  11/1982  Levenson ............................. 374/144
4,446,723  5/1984  Böning et al. ........................ 374/144

FOREIGN PATENT DOCUMENTS 3203149  8/1983  Fed. Rep. of Germany ........ 313/10

Primary Examiner—Thomas B. Will
Assistant Examiner—Diego F. F. Gutierrez
Attorney, Agent, or Firm—Cooper & Dunham

[57] ABSTRACT

A temperature sensor in which a thermocouple is embedded in a front end of a center electrode of a spark plug, the front end of which is disposed in a combustion chamber of an internal engine, and including a digital-optical converter which is arranged to convert the potential of the thermocouple into an optical output representing the temperature of the spark plug. A connector is arranged to be removably connected to a receptacle in the digital-optical converter. The connector has a pair of contacts which are adapted to energize the digital-optical converter when the connector is electrically connected to the receptacle.

2 Claims, 3 Drawing Sheets

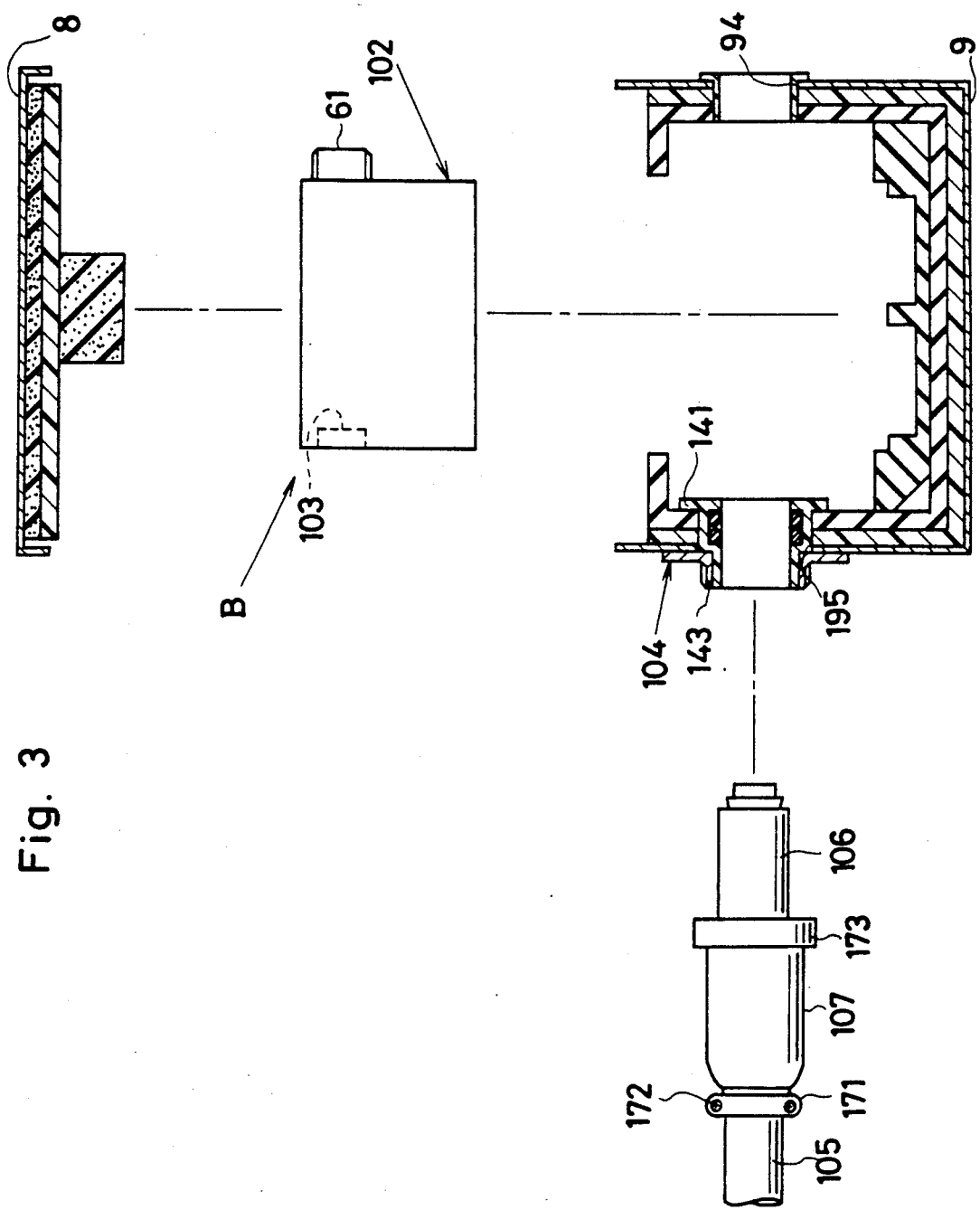

TEMPERATURE SENSOR FOR USE IN A SPARK PLUG OF AN INTERNAL COMBUSTION ENGINE

BACKGROUND OF THE INVENTION

1. Field of the Invention

The invention relates to a temperature sensor for a spark plug of an internal combustion engine which is capable of measuring the temperature at the front end of a spark plug electrode.

2. Description of Prior Art

In a spark plug generally used for internal combustion engine, the temperature of the spark plug is measured for the purpose of appropriately arranging a degree of gas mixture, intake temperature, ignition timing, revolution speed, intake and exhaust pressure.

As one example of this kind of spark plug, the applicant of this application had previously suggested a model shown in Japanese Utility Model Publication No. 63-67835.

According to the Utility Model Publication No. 63-67835, the applicant have found the following disadvantages.

(i) No shield is taken into consideration, so that there is a tendency of leaking at any level of noise. The cord or cable which picks up the potential of the thermocouple, is electrically connected to a high tension line so that the cord or cable has tendency of inducing noise. Further, the electrically conductive case is connected to the high tension line so that noise is induced from the spark plug body, the plug cap, the case, the cord and the like. The noise influences measuring the temperature of the spark plug body.

(ii) The electrically conductive case is connected to the high tension cord so that the case is kept at high voltage to induce spark to the ground particularly when the grounding deteriorates.

(iii) To provide a shield with the case so as to avoid leakage, it is necessary to provide enough insulation, thus requiring a large device, and at the same time, making it cumbersome to handle.

(iv) The cable is fixebly secured to the converter so that it is necessary to individually provide a different connector each time a different spark plug is introduced.

(v) It is impossible to remove the converter from the case, and thus making it difficult to check the converter and replace battery cells.

Therefore, it is one object of this invention to obtain a temperature sensor which is capable of easily connecting to a spark plug body, and readily checking a converter and replacing battery cells.

It is another object of this invention to a obtain temperature sensor which is capable of reducing the level of noise, and at the same time, high voltage breakdown, and making easy to handle.

According to the present invention, the noise leaking from the outer insulator sleeve is shielded by the metallic sheet to contribute to the reduction of noise. The electrical connection among the high tension cord, the shield wire and the spark plug body, is facilitated by a single outer insulator sleeve.

The outer, middle and inner shaft is provided to connect to the triple coaxial plug, thus preventing the diameter of the spark plug body from the being unnecessarily enlarged.

Further, the high tension cord and the shield cord are placed into the outer insulator sleeve in addition to the shield coat being connected to the metallic sheet. This enables to protect the high tension cord and the shield wire against the leakage of noise.

The interconnecting case is enclosed by the shield case in electrically insulating relationship with the shield case. The shield case is avoided from being kept at high voltage to ensure safety. The interconnecting case is electrically insulated from the shield case so as to prevent electrical elements of the converter from being broken down.

Various other objects and advantages of the present invention will appear in the following description and in the accompanying drawings.

BRIEF DESCRIPTION OF THE DRAWINGS

FIG. 3 is an exploded view of the temperature measurement device.

DETAILED DESCRIPTION OF THE EMBODIMENTS

Figure 1:
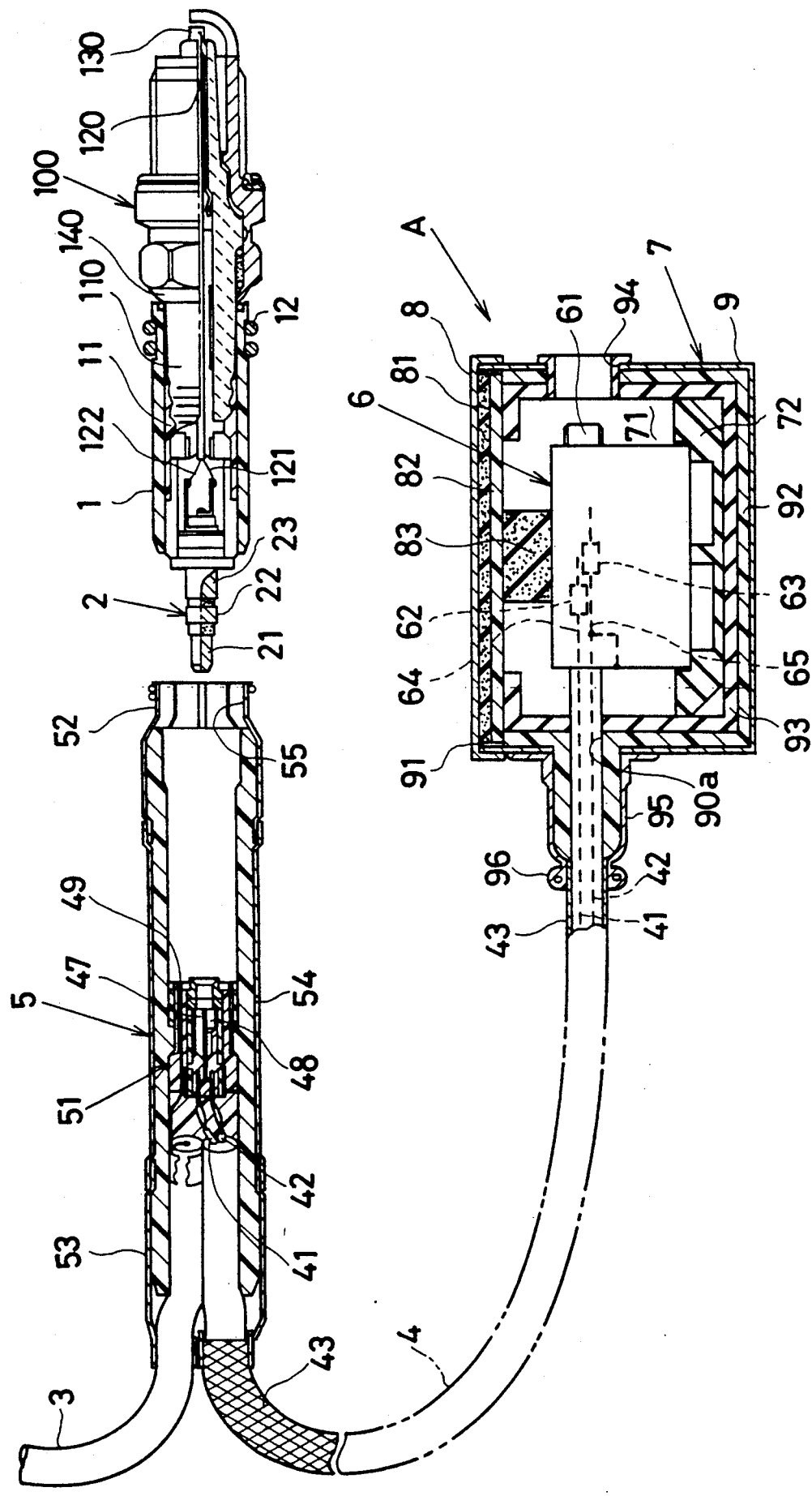
FIG. 1 is a longitudinal cross sectional view of a temperature sensor inside a spark plug body.

Referring to FIG. 1, a temperature measurement device (A) of a spark plug body 100 is shown which has an inner insulator sleeve 1 enclosing an insulator 110 of the spark plug body 100. At a rear end portion of the sleeve 1, a triple coaxial plug 2 is placed, while the sleeve 1 is adapted to be telescoped by an outer insulator sleeve 5. The outer insulator sleeve 5 encloses a high tension cord or cable 3 and a shield cord or cable 4 which electrically connect the potential of a thermocouple 120 to a digital-optical converter. The converter is enclosed by an interconnecting case 6 which is enclosed by a shield case 7 in electrically insulating relationship with the interconnecting case 6.

The inner insulator sleeve 1 is made of an elastic rubber, and moulded rubber 11 is provided between the sleeve 1 and the insulator 110. At an outer surface of the sleeve 1, O-ring 12 is placed to secure the sleeve 1 against the removal when the sleeve 1 is telescoped by the outer insulator sleeve 5.

On the other hand, the triple coaxial plug 2 has inner, middle and outer shaft which, in turn, correspond to a positive pole 21 and a negative pole 22 of the thermocouple 120 and a high tension pole 23. The positive and negative poles 21, 22, are each electrically connected to lead wires 121, 122 extended from the thermocouple 120 which is embedded in a front end of a center electrode 130, and the high tension pole 23 acts to electrically connect to the center electrode 130 of the spark plug body 100.

The high tension cord 3 is electrically connected at one end to an ignition coil (not shown), and having a core resistor of 16K ohm/m with its outer surface coated by a silicone resin having 8 mm in diameter.

The shield cord 4 (cable of 50 KV in withstand voltage) includes a pair of coated wires 41, 42 therein, and covered by a wire-meshed shield coat 43, one end of which connects to a metallic ring 53 covering the outer insulator sleeve 5. Into the sleeve 5, a triple coaxial jack 51 is enclosed. The sleeve 5 has expandable rings 52, 53 (metallic sheet) at both open ends.

The middle portion of the sleeve 5 is covered by an electrically conductive tape 54 which effectively shields the sleeve 5. The ring 52 is expandably arranged at its diameter by a spring, and acts to bring its front end 55 into electrical engagement with a housing 140 of the spark plug body 100 when the sleeve 1 is telescoped by the outer insulator sleeve 5. The triple coaxial jack 51 has contacts 47, 48, 49 which, in turn, correspond to the poles 21, 22, 23 of the triple coaxial plug 2. The contacts 47, 48, 49, are located each at one end of coated wires 41, 42 and the high tension cord 3.

The interconnecting case 6 is made of aluminum and into a rectangular parallelopiped shape so as to ensure enough electromagnetical shield effect. The case 6 has a connector 61 at one side to which an optical fiber (not shown) is connected, and having lead wires 64, 65 which, in turn, are introduced to an input terminal of the optical converter via resistors 62, 63, to which the other respective ends of the coated wires 41, 42 are electrically connected. The coated wire 42 is electrically connected to the interconnecting case 6 itself within this case 6. Between the case 6 and the shield case 7, there is provided space 71, the dimension of which is about 5 mm 15 mm in width, and the case 6 is located by a pedestal 72 in electrically insulating relationship with the shield case 7. The shield case 7 is made of aluminum which is 60 mm in longitudinal length, 60 mm in hight and 85 mm in latitudinal length.

On an upper open end 91 of the shield case 7, a lid 8 is removably mounted, lower side of which has two layers 81, 82 of sponge and silicone rubber. The silicone rubber layer 82 has a piece of plate-like sponge 83 which elastically engages with the upper surface of the interconnecting case 6 when the open end 91 is closed by the lid 8. A case body 9 of the shield case 7 has a silicone rubber mould 92 and a synthetic resin case 93 respectively at its inner.

An upper open end of the synthetic resin case 93 is communicated with the open end 91. The case body 9 has an opening 94 at one side to pass through the optical fiber cable which is introduced from the connector 61. At the other side of the case body 9, an opening 90a is provided in a manner to pierce the silicone rubber mould 92 and the synthetic resin case 93. The opening 90a admits the shield coat 43, and secured by means of a grommet 95. The grommet 95 has a clamp 96 which facilitates the bringing of the grommet 95 into electrical engagement with the case body 9.

According to the present invention, the following effects are obtained.

(a) Positive and negative electrodes 21, 22 of the thermocouple 120 are readily introduced outside, thus preventing from increasing the diameter of the spark plug body 100 so as to be easily mounted on an engine cylinder head.

(b) Owing to the shield by the metallic rings 52, 53 and the electrically conductive tape 54, the insulator 110 of the spark plug body 100 is protected against noise leakage.

(c) Due to the fact that the high tension cord 3 and the shield cord 4 are enclosed into the outer insulator sleeve 5, and the shield coat 43 is connected at one end to the metallic ring 53, the outer insulator sleeve 5 is protected against noise leakage.

(d) From the reason that the coated wires 41, 42 are connected to the lead wires 64, 65, and the shield coat 43 is connected to the clamp 96 of the grommet 95, the noise carried by a high voltage impressed to the spark plug body 100, is shielded by the shield coat 43.

(e) The space 71 is provided between the interconnecting case 6 and the shield case 7, thus preventing from increasing a floating capacity of the ignition coil so as to avoid the electrical elements of the converter from being easily broken down.

(f) Sufficient electrical insulation is ensured between the interconnecting case 6 and the shield case 7 from the reason that the case 6 is located on the pedestal 72.

It is noted that a triple coaxial jack may be placed instead of the triple coaxial plug 2.

Now, referring to FIGS. 2 and 3, another embodiment of the invention is described hereinafter.

Figure 2:
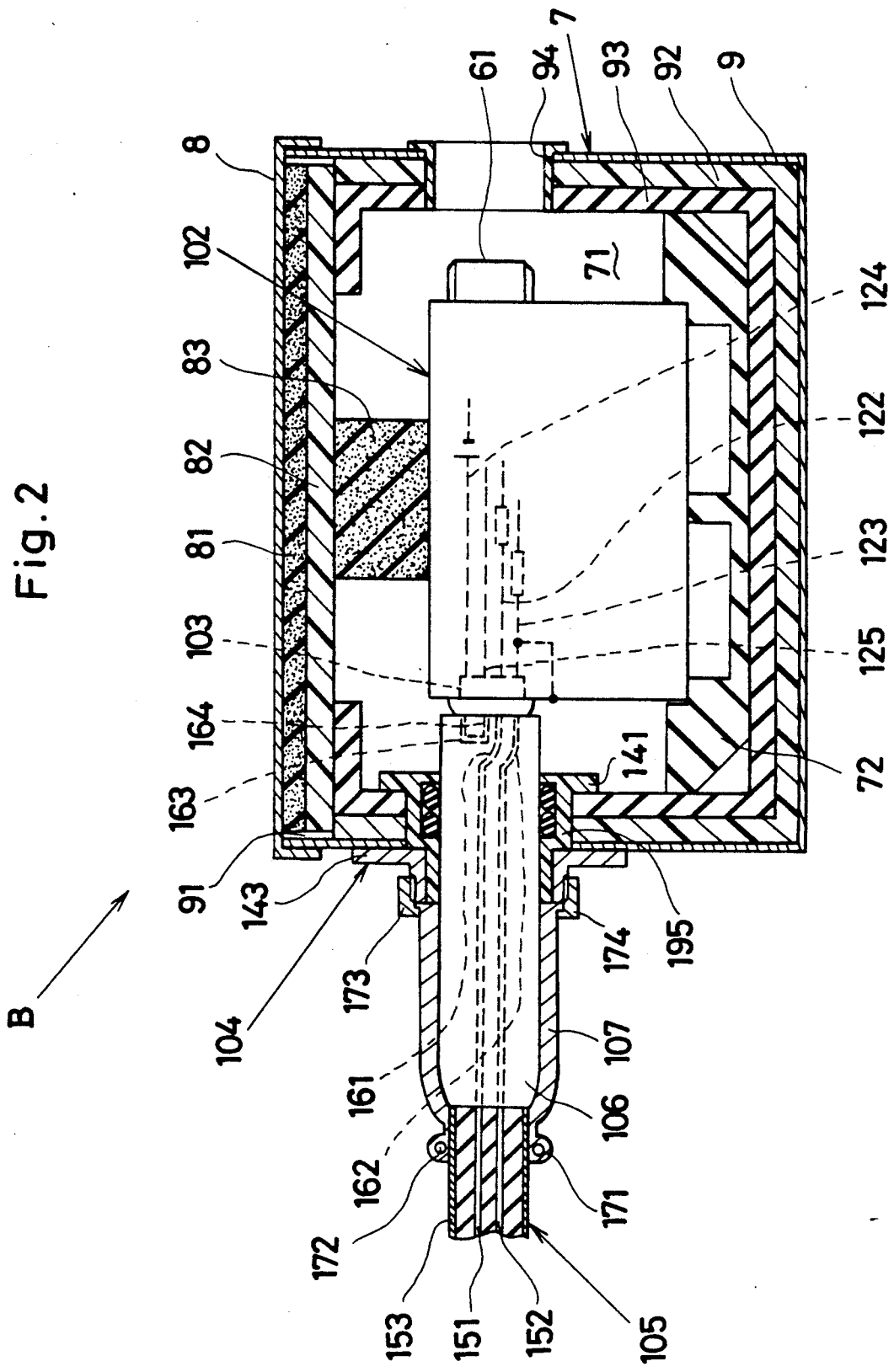
FIG. 2 is partly sectioned view of a temperature measurement device.

In a temperature sensor (B) for a spark plug, like reference numerals identical to FIG. 1 designate like reference parts throughout FIGS. 2, 3, and reference parts other than the preceding embodiment are only described.

A receptacle 103 is mounted on an interconnecting case 102, and having pins (not shown), to which lead wires 122, 123, 124, 125 are, in turn, electrically connected. The lead wire 123 is electrically connected to the interconnecting case 100 within it. A plastic ring 141 is encased into an annular wall of an opening 195 provided at one side of the case body 9. To one side of the case body 9, a metallic guide ring 143 is secured in communicating relationship with the plastic ring 141 to form a guide flange 104. The guide ring 143 has a male thread at its outer surface which mates with a ring nut 173 to fasten a metallic grommet 107 as described hereinafter. A shield cord 105 has a pair of coated wires 151, 152 embedded by means of electrical insulation material, and covered by a shield coat 153 as described at the preceding embodiment. The shield coat 153 is connected at one end to the grommet 107, and secured each other at the connection by a clamp 171 and a screw 172. Thus an electrical connection from the shield coat 153 to the shield case 7 through the grommet 107, is allowed.

A plastic connector 106 is placed into the grommet 107 allowing the coated wires 151, 152 to pass through so as to connect to the contacts 161, 162. Each end of the contacts 163, 164 is adapted to be brought into engagement with that of an electrical source circuit so as to energize the converter when the plastic connector 106 is electrically connected to the receptacle The grommet 107 is removably mounted by securing the ring nut 173 to the male thread of the ring 143, so that the ring nut 173 is brought into engagement with a stop flange 174.

According to this embodiment of the invention, the plastic connector 106 is removably connected to the receptacle 103, and it is sufficient to replace the connector 106 and shield cord 105 when a different kind of spark plug is measured.

Although various modifications might be suggested by those versed in the art, it should be understood that we wish to embody within the scope of the patent hereon all such modifications as reasonably and properly come within the scope of our contribution to the art.

What is claimed is:

1. A temperature sensor in which a thermocouple is embedded in a front end of a spark plug body, the front end of which is disposed in a combustion chamber of an internal combustion engine, and including an optical converter in which an output of the thermocouple is converter into an optical output signal when a temperature of the front end of the spark plug body exceeds a predetermined value, the temperature sensor comprising;

an inner insulator sleeve which is arranged to enclose a rear portion of the spark plug body;

tripolar coaxial plug or tripolar coaxial jack disposed to extend outside of a rear end of the inner insulator sleeve, and having outer, middle and inner shaft portion, the outer shaft portion being electrically connected to a center electrode of the spark plug body, while the middle and inner shaft portion being each connected to the thermocouple through lead wires;

an outer insulator sleeve covered by a metallic ring, the outer insulator sleeve being arranged to be detachably telescoped into the inner insulator sleeve, one end of the outer insulator sleeve being brought into engagement with a housing of the spark plug body when the outer insulator sleeve is telescope into the inner insulator sleeve;

the tripolar coaxial plug or tripolar coaxial jack being placed within the outer insulator sleeve to be electrically connected to the tripolar coaxial jack or the tripolar coaxial plug when the outer insulator sleeve is telescoped into the inner insulator sleeve;

a high tension cord provided to be electrically connected to the tripolar coaxial plug or tripolar coaxial jack of the outer insulator sleeve so as to supply a high voltage with the center electrode; a shield cord electrically connected to the tripolar coaxial plug or tripolar coaxial jack of the outer insulator sleeve;

the shield cord and the high tension cord being introduced outside from an end opposite to that in which the outer insulator sleeve is telescoped into the inner insulator;

the shield cord having a pair of coated wires covered by a shield coat respectively, each one end of which is electrically connected to a corresponding terminal of the thermocouple through the tripolar coaxial plug or the tripolar coaxial jack, the other end of each coated wire being electrically connected to a corresponding input terminal of the optical converter in which a resistor is adapted to be energized to emit light beams when the output of the thermocouple reaches to a predetermined value; and a shield coating portions of the shield cord being electrically connected at one end to the metallic ring of the outer insulator sleeve.

2. A temperature sensor as recited in claim 1 further comprising an interconnecting case provided to encase the optical converter therein, and a shield case arranged to enclose the interconnecting case therein in electrically insulating relationship with the interconnecting case.

* * * * *